UNITED STATES PATENT OFFICE.

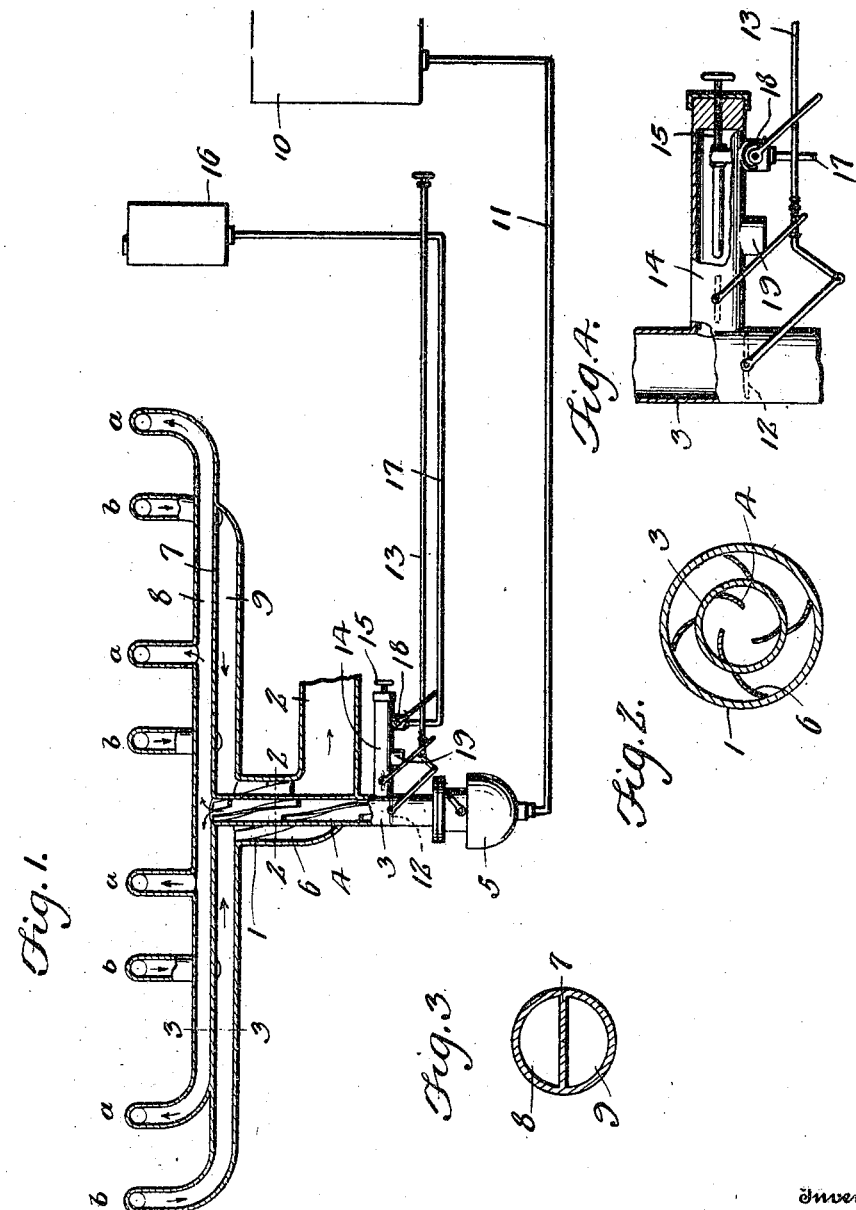

RALPH B. BELDON, OF JEFFERSON, OHIO.

VAPORIZER AND MIXER FOR INTERNAL-COMBUSTION ENGINES.

1,272,898.

Specification of Letters Patent. Patented July 16, 1918.

Application filed September 12, 1916. Serial No. 119,742.

*To all whom it may concern:*

Be it known that I, RALPH B. BELDON, a citizen of the United States, residing at Jefferson, in the county of Ashtabula and State of Ohio, have invented new and useful Improvements in Vaporizers and Mixers for Internal-Combustion Engines, of which the following is a specification.

This invention relates to kerosene attachments for internal combustion engines, the object in view being to provide an apparatus adapted for use in connection with the present day gasolene engine whereby lower grades of oil such as kerosene may be used in place of the more highly volatile hydrocarbons after the engine has been started, thereby greatly economizing in the running expenses of automobiles, motor boats and other craft.

With the above general object in view, the invention consists in the novel construction, combination and arrangement herein fully described, illustrated and claimed.

In the accompanying drawing:

Figure 1 is a vertical sectional view of the apparatus of this invention.

Fig. 2 is a section on the line 2—2 of Fig. 1.

Fig. 3 is a section on the line 3—3 of Fig. 1.

Fig. 4 is an enlarged fragmentary elevation, partly broken away, showing the valve operating means.

Referring to the drawings, 1 designates the exhaust manifold of an internal combustion engine the same being shown as provided with an elbow or right angular extension 2 which usually leads to the muffler or final point of outlet of the burned gases. The intake pipe 3 passes centrally through and is inclosed by the large vertical portion of the exhaust manifold 1 as shown and is provided on its inner side with spiral ribs 4 to cause a swirling action of the inrushing mixture from the carbureter 5 which is designed for the use of a lower grade of oil such as kerosene. In like manner the exhaust manifold 1 is provided along its inner surface with spiral deflectors or ribs 6 which produce a swirling action of the exhaust thereby causing a more thorough heating of the contents of the intake pipe 3, this being important in order to gasify the kerosene and produce a highly combustible vapor within the combustion chambers of the engine.

The intake and exhaust manifolds leading directly to the several combustion chambers of a multiple cylinder engine, are made in the form illustrated in Fig. 3, a single pipe handling both the intake and exhaust but being formed into two separate compartments by an interposed partition 7, the upper space 8 of the pipe being preferably used for the intake and the lower space 9 being used for the exhaust thereby causing the incoming mixture to be more effectively heated by the outgoing exhaust. The intake branches connect with the cylinders of the engine at the points $a$, $a$, $a$ and $a$, and the exhaust branches connect with the engine at the points $b$, $b$, $b$ and $b$.

10 represents the kerosene reservoir connected by a feed pipe 11 to the kerosene carbureter 5. A throttle valve 12 is incorporated in the intake pipe 3 just beyond the carbureter and is operated by means of a rod 13 in order that it may be opened and closed as found necessary.

Connected with the intake pipe 3 above the throttle valve 12 is a gasolene valve casing 14 in which operates a gasolene regulating valve 15. 16 designates the gasolene tank which is connected by a feed pipe 17 to a cut-off valve chamber 18, the valve of which is also controlled by the rod 13, the cut-off valve being closed simultaneously with the opening of the throttle 12 after the engine has been started. The casing 14 also comprises an air inlet 19 just back of the point where the gasolene is admitted to the casing 14, the suction of the pistons of the engine pulling air through the inlet 19 and causing the latter to take up the gasolene and conduct the same into and through the intake pipe 3 and the branches of the intake manifold to the combustion chambers of the cylinders.

In starting the engine, the rod 13 is operated so as to cut off the kerosene carbureter 5 and open the valve controlling the gasolene feed. The engine is then started in the usual manner and after running a short while and becoming heated, the rod 13 is returned to its former position thereby cutting off the flow of gasolene after which the engine draws its supply of combustible mixture from the kerosene carbureter 5. In passing through the intake manifold and its branches, the kerosene is highly heated by the exhaust gases passing outwardly from the exhaust branches of the exhaust manifold.

I claim:

The combination with an internal combustion engine, of an exhaust manifold outlet embodying a relatively large main body portion, a fuel intake pipe having spirally disposed deflectors on the outer surface thereof lying within said outlet, said fuel intake pipe extending centrally through said body portion of the exhaust manifold and having internal spirally disposed deflectors, manifold branches leading from the said intake pipe, and exhaust manifold branches leading toward the said main body portion of the exhaust manifold, the said intake and exhaust manifold branches for each cylinder being formed by the same pipe, the latter having a partition to separate the intake from the exhaust and cause the exhaust to heat the incoming mixture.

In testimony whereof I affix my signature.

RALPH B. BELDON.